United States Patent
Budris et al.

[19]

[11] Patent Number: 6,138,951
[45] Date of Patent: Oct. 31, 2000

[54] SPACECRAFT DISPENSING SYSTEM

[75] Inventors: George J. Budris, Huntington Beach; Peter A. McGrath, II, Tustin; Tony L. Toulouse, Irvine; Richard J. Catalano, Fountain Valley; Michael B. Diverde, Rancho Santa Margarita, all of Calif.

[73] Assignee: McDonnell Douglas Corporation, Seal Beach, Calif.

[21] Appl. No.: 09/131,475

[22] Filed: Aug. 10, 1998

[51] Int. Cl.[7] .............................. B64G 1/00; B64G 1/22; F42B 12/58
[52] U.S. Cl. ...................................... 244/158 R; 102/393
[58] Field of Search ........................... 244/118.1, 158 R, 244/161; 102/393, 386, 394, 438

[56] References Cited

U.S. PATENT DOCUMENTS

| | | | |
|---|---|---|---|
| 2,925,965 | 2/1960 | Pierce | 244/14 |
| 2,938,686 | 5/1960 | Van Winkle et al. | 244/118 |
| 2,958,260 | 11/1960 | Anderson | 89/1.7 |
| 2,972,946 | 2/1961 | Poulter | 102/393 |
| 2,976,806 | 3/1961 | Risk et al. | 102/92.5 |
| 3,107,616 | 10/1963 | Boaz et al. | 102/61 |
| 3,461,801 | 8/1969 | Vitale et al. | 102/357 |
| 3,712,229 | 1/1973 | Schock | 102/69 |
| 3,726,223 | 4/1973 | Moe | 102/475 |
| 3,907,225 | 9/1975 | Welther | 244/158 |
| 3,948,175 | 4/1976 | Bucklisch | 102/5 |
| 4,044,974 | 8/1977 | Lingley et al. | 244/161 |
| 4,067,308 | 1/1978 | Andersen et al. | 124/16 |
| 4,106,389 | 8/1978 | Walley | 89/1.815 |
| 4,181,062 | 1/1980 | Bernstein et al. | 89/1.57 |
| 4,233,882 | 11/1980 | Eichweber | 89/1 L |
| 4,298,178 | 11/1981 | Hujsak | 244/158 R |
| 4,342,262 | 8/1982 | Romer et al. | 102/489 |
| 4,372,216 | 2/1983 | Pinson et al. | 102/489 |
| 4,444,117 | 4/1984 | Mitchell, Jr. | 102/489 |
| 4,455,943 | 6/1984 | Pinson | 102/489 |
| 4,480,552 | 11/1984 | Eckel et al. | 102/393 |
| 4,488,489 | 12/1984 | Schoffl | 102/489 |
| 4,506,852 | 3/1985 | Adams et al. | 244/158 R |

(List continued on next page.)

FOREIGN PATENT DOCUMENTS

| | | | |
|---|---|---|---|
| 2558354 | 6/1976 | Germany | 244/158 R |
| 3002551 | 7/1981 | Germany | 244/158 R |
| 3732752 | 4/1989 | Germany | 102/393 |
| 2107440 | 4/1983 | United Kingdom | 102/393 |
| WO 87/02006 | 4/1987 | WIPO | 244/158 R |
| WO 87/04372 | 7/1987 | WIPO | 244/158 R |

*Primary Examiner*—Michael J. Carone
*Assistant Examiner*—Fredrick T. French, III
*Attorney, Agent, or Firm*—Lawrence N. Ginsberg

[57] ABSTRACT

A dispensing system for releasing a number of spacecraft from a launch vehicle. The dispensing system includes a base support structure securely fastened to a launch vehicle and a number of stacked frame assemblies. Each frame assembly includes a number of substantially parallel load bearing elongated post elements and a shear load transferring structure. The post elements are so arranged and spaced so as to define a geometry having a centerline. Each post element has a first end portion and a second end portion. Each first end portion is connected to either another frame assembly or the base support structure of the launch vehicle. The post elements support a number of spacecraft. The spacecraft are supported between adjacent post elements. The shear load transferring structure is connected to the post elements for transferring shear loads between the post elements. The dispensing system also includes a plurality of longitudinally spaced stabilizers connected to desired locations on the post elements to increase the buckling capability of the dispensing system. The provision of a plurality of stacked frame assemblies provides a modular structure which does not require attachment to external supports other than via the base support structure.

17 Claims, 4 Drawing Sheets

U.S. PATENT DOCUMENTS

| | | | |
|---|---|---|---|
| 4,558,645 | 12/1985 | Boeder et al. | 102/489 |
| 4,625,646 | 12/1986 | Pinson | 102/489 |
| 4,632,339 | 12/1986 | Yuan | 244/158 R |
| 4,679,752 | 7/1987 | Wittmann et al. | 244/158 R |
| 4,688,486 | 8/1987 | Hall et al. | 102/489 |
| 4,957,046 | 9/1990 | Puttock | 102/489 |
| 4,998,480 | 3/1991 | Denis et al. | 102/393 |
| 5,005,481 | 4/1991 | Schneider et al. | 102/393 |
| 5,040,748 | 8/1991 | Torre et al. | 244/158 R |
| 5,107,767 | 4/1992 | Schneider et al. | 102/393 |
| 5,125,601 | 6/1992 | Monford, Jr. | 244/161 |
| 5,199,672 | 4/1993 | King et al. | 244/158 R |
| 5,226,617 | 7/1993 | Panin | 244/158 R |
| 5,411,226 | 5/1995 | Jones et al. | 244/158 R |
| 5,605,308 | 2/1997 | Quan et al. | 244/158 R |
| 5,613,653 | 3/1997 | Bombled et al. | 244/158 R |
| 5,720,450 | 2/1998 | Kanne | 244/158 R |
| 5,755,407 | 5/1998 | Aubret et al. | 244/161 |
| 5,779,195 | 7/1998 | Basuthakur et al. | 244/161 |
| 5,860,624 | 1/1999 | Obry et al. | 244/158 R |
| 5,884,866 | 3/1999 | Steinmeyer et al. | 244/137.1 |

SPACECRAFT DISPENSING SYSTEM

BACKGROUND OF THE INVENTION

1. Field of the Invention

The present invention relates to dispensing systems for releasing spacecraft from launch vehicles and more particularly to a dispensing system which is modular and selectively configurable for deploying multiple spacecraft from a launch vehicle.

2. Description of the Related Art

Modem constellations of communication networks require a large number of satellites. To minimize the costs of the network, it is desired to maximize the amount of satellites that may be launched from the launch vehicle per launch. When a very powerful launch vehicle is used it provides a large volume available to support multiple satellites. This payload volume is very long and puts the satellite dispenser structure under a great challenge of meeting the launch vehicle structural and interface requirements. The dispenser is required to have a high lateral stiffness when loaded down with large, massive spacecraft.

Others have attempted to provide improved dispensing of multiple spacecraft. For example, U.S. Pat. No. 5,613,653, issued to Bombled et al, discloses a multi-satellite distributor for putting into orbit a group of satellites from one or more different types of launchers. The distributor has a mast adapted for use with each of the types of launchers, and interface members for mounting the satellites or the mast.

U.S. Pat. No. 5,605,308, issued to Quan et al, discloses a space vehicle dispenser which includes an inverted outer truncated cone and an upright inner truncated cone positioned within the outer cone and connected thereto at lower end portions thereof The spacecraft are mounted to the dispenser from the base of the spacecraft.

U.S. Pat. No. 4,558,645, issued to D. Boeder, discloses a warhead for transporting a plurality of useful loads which are disposed in a "useful" load chamber of the warhead. The warhead includes a casing in which a star-shaped hollow body is disposed. The hollow body acts as a brace for the structural assembly and has a central axial pressurized gas passage. The hollow body divides the useful load chamber into a plurality of cells in each one of which a useful load is mounted. Each cell also has an inflatable bag which is disposed radially inwardly relative to the useful load. Each inflatable bag is in fluid communication with the central axial pressurized gas passage and is adapted to expel the useful load transversely with respect to the direction of the flight of the warhead upon receiving an internal or external command.

U.S. Pat. No. 3,726,223, issued to R. G. Moe, discloses a mechanism comprising a collapsed diaphragm of sheet material surrounding a staged gas generator. The staged gas generator, when peripherally initiated, allows the application of a predetermined force over a relatively long time period against the submissiles with a resultant high ejection loss in a radial direction.

U.S. Pat. No. 5,107,767, issued to M. D. Schneider et al, discloses the use of a carrier frame with a central structure defining an envelope to house munitions.

U.S. Pat. No. 3,461,801, issued to D. J. Vitale et al, discloses an apparatus for jettisoning a cluster of instrument canisters into the upper atmosphere having abutting propellant filled hollow pistons simultaneously ignited by a central located detonator. The device utilizes a square-shaped central piston structure with web members extending radially from the central piston to provide sectors for the canisters and to allow for attachment of the explosive actuators.

None of the above patents disclose a particularly effective modular structure which obviates attachment to external supports other than via a base support structure.

OBJECTS AND SUMMARY OF THE INVENTION

It is therefore a principal object of the present invention to provide an efficient modular dispensing system for releasing a plurality of spacecraft from a launch vehicle.

It is another object to provide a dispensing system which does not require attachment to external support other than via a base support structure.

It is another object to obviate any requirement that the spacecraft or launch vehicle offer structural support or added stiffness to the dispensing system.

It is yet another object to sequentially displace spacecraft or optionally provide simultaneous dispensing.

It is still another object to provide a frame assembly for a spacecraft dispensing system which allows installation of spacecraft in an inwardly radial direction, thus providing installation of spacecraft in desired positions without requiring a predetermined sequence of installation.

It is still another object to provide easy access for launch vehicle components.

In a broad aspect, the present invention is a dispensing system for releasing a plurality of spacecraft from a launch vehicle. The dispensing system includes a base support structure securely fastened to a launch vehicle and a plurality of stacked frame assemblies. Each frame assembly includes a plurality of substantially parallel load bearing elongated post elements and shear load transferring means. The post elements are so arranged and spaced so as to define a geometry having a centerline. Each post element has a first end portion and a second end portion. Each first end portion is connected to either another frame assembly or to the base support structure of the launch vehicle. The post elements support a plurality of spacecraft. The spacecraft are supported between adjacent post elements. The shear load transferring means is connected to the post elements for transferring shear loads between the post elements. The dispensing system also includes a plurality of longitudinally spaced stabilizers connected to desired locations on the post elements to increase the buckling capability of the dispensing system. The provision of a plurality of stacked frame assemblies provides a modular structure which does not require attachment to external supports other than via the base support structure.

These and other objects, advantages and novel features of the present invention will become apparent from the following detailed description of the invention when considered in conjunction with the accompanying drawings.

BRIEF DESCRIPTION OF THE DRAWINGS

The same elements or parts throughout the figures are designated by the same reference of characters.

DETAILED DESCRIPTION OF THE PREFERRED EMBODIMENT

Figure 1:
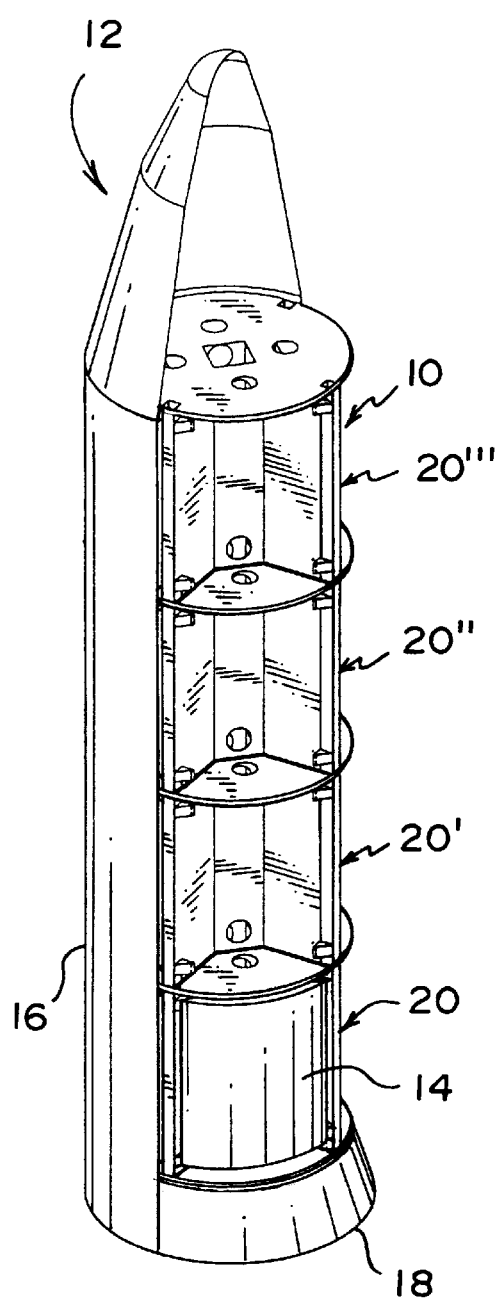
FIG. 1 is a perspective view of a portion of an upper stage of a launch vehicle, partially cut away to expose the spacecraft dispensing system of the present invention.

Referring now to the drawings and the characters of reference marked thereon, FIG. 1 shows the dispensing system of the present invention, designated generally as 10, incorporated within a portion of an upper stage of a launch vehicle, designated generally as 12.

As background, the upper stage 12 has a set of propellant tanks, an engine and assorted electronics (these components not shown) for injecting the upper stage 12 into orbit. At this point, the spacecraft (one of which is shown, designated as 14) are dispensed and perform their missions. A fairing 16 which surrounds the dispensing system 10 and spacecraft positioned thereon, protects the same from aerodynamic forces during the phases of flight through the atmosphere. Fairing 16 separates from the remaining portions of upper stage 12 as soon as aerodynamic forces drop below a certain value.

Figure 2:
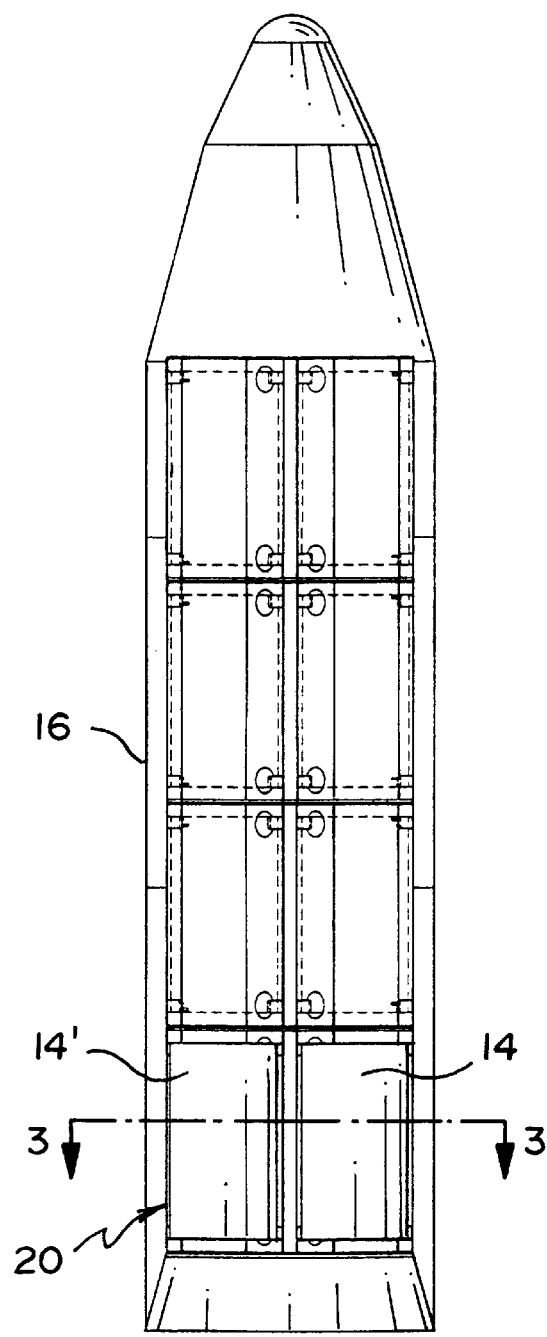
FIG. 2 is a side view of the portion of the upper stage of FIG. 1, with phantom lines representing spacecraft envelopes.
Figure 3:
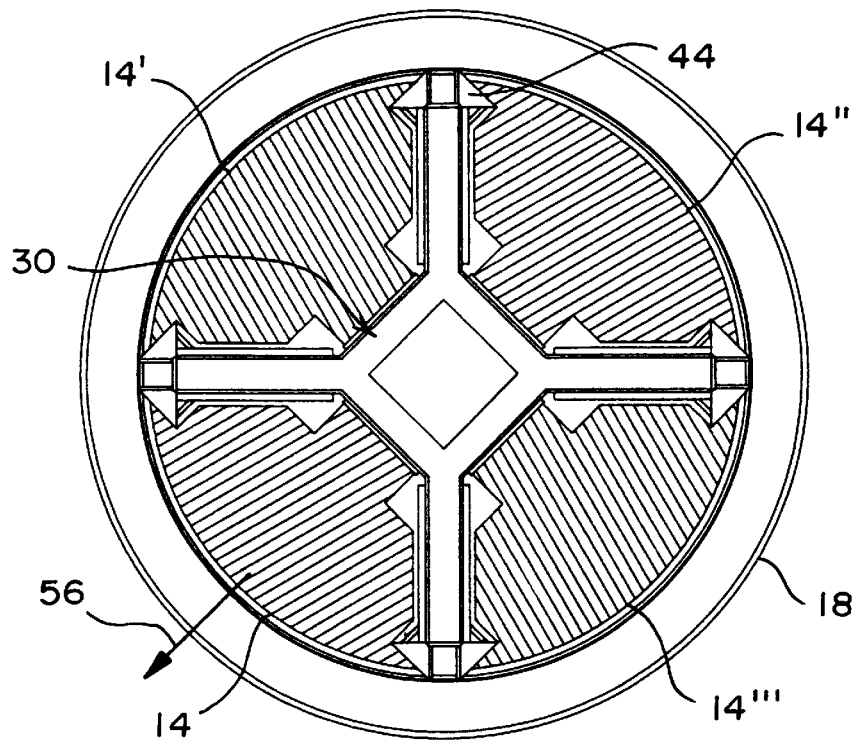
FIG. 3 is a view taken along line 3—3 of FIG. 2.

The dispensing system 10 includes a base support structure 18 which is securely attached to a portion of the upper stage, not shown. The base support structure 18 is a transitional structure which supports a plurality of stacked frame assemblies 20, 20', 20", 20'". The frame assemblies 20, 20', 20", 20'" support the spacecraft. FIG. 1 shows the spacecraft 14 positioned within the frame assembly 20. FIG. 2 shows two spacecraft 14, 14' positioned within the frame assembly 20. As can be seen in FIG. 3, four spacecraft 14, 14', 14", 14'" can be supported within a single frame assembly 20.

Figure 4:
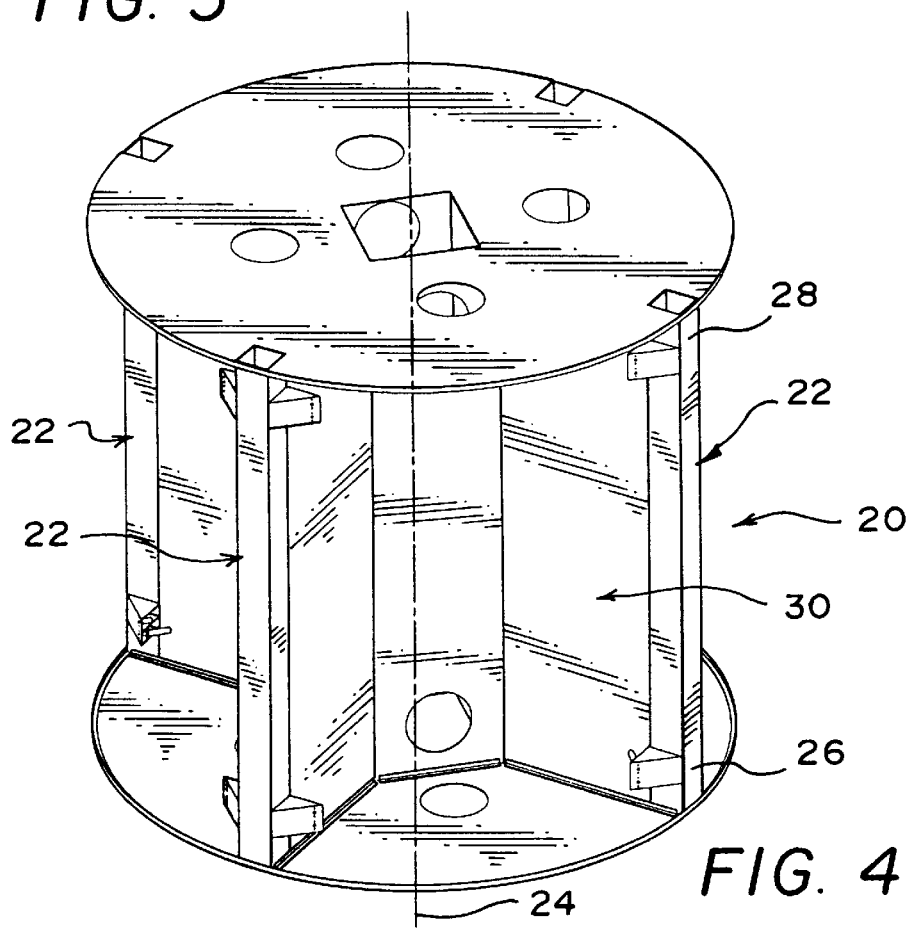
FIG. 4 is a perspective view of a frame assembly for supporting a plurality of spacecraft, in accordance with the principles of the present invention.

Referring now to FIG. 4, a single frame assembly 20 is shown apart from the rest of the dispensing system 10 for the purpose of clarity. The frame assembly 20 includes four post elements 22 which are arranged and spaced so as to define a geometry having a centerline 24. Each post element 22 has a first end portion 26 and a second end portion 28. Each first end portion 26 is connectable to either another frame assembly or to the base support structure 18. The spacecraft are supported between adjacent post elements. The post elements are preferably formed of a graphite epoxy matrix having a cross section of a rectangular shell. However, other suitable materials and cross sections are possible within the purview of one skilled in the art. Although frame assembly 20 is shown with four post elements 22, varying numbers of post elements may be used to accommodate specific spacecraft geometries. The post elements provide the primary load path from the spacecraft to the launch vehicle.

Figure 5:
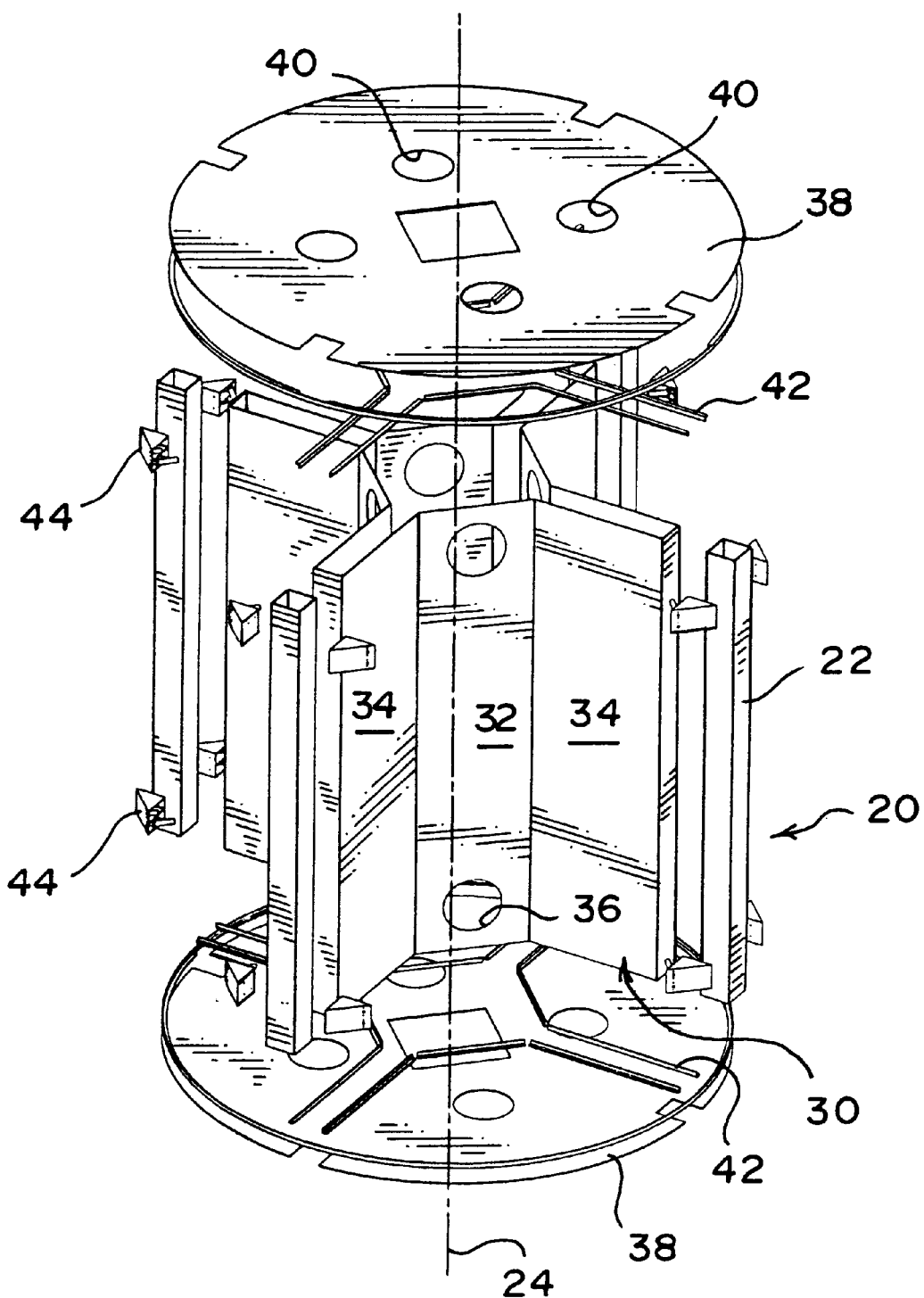
FIG. 5 is an exploded perspective of the frame assembly of FIG. 4.

A shear load transferring means, designated generally as 30, is connected to the post elements 22 for transferring shear loads between the post elements 22. Referring now to FIG. 5, it can be seen that the shear load transferring means 30 includes an elongated hollow central body 32, the central body being elongated along the centerline 24. A plurality of radially extending arms 34 extend from the central body 32. The arms 34 attach to the post elements 22. The arms 34 are fastened to the post elements 22 by either discrete shear carrying fasteners, adhesive bonding, or a combination of both. The shear load transferring means 30 illustrated in FIG. 5 has radial extending arms 34 having widths that match the post elements 22. The number of arms 34 matches the number of post elements 22. The material forming the shear load transferring means 30 may be the same as the post elements 22. The central body 32 is preferably hollowed to allow access to internal components on the launch vehicle or the spacecraft. However, structural efficiency may dictate a solid central body. The central body 32 preferably includes a plurality of openings 36 for providing access for launch vehicle components.

Longitudinally spaced stabilizers 38 are connected to desired locations on the post elements 22 to increase the buckling capability of the dispensing system. These stabilizers 38 are preferably located at the ends of the post elements 22, as shown in the figure. Each stabilizer 38 is a flat panel. It may be formed of similar materials as those used to form the post elements 22. Access holes 40 are preferably provided in the stabilizers 38 to gain access between frame assemblies. The stabilizers 38 are spliced to the shear load transferring means 30 by angle brackets 42. Each frame assembly 20 may have a length generally on the order of from about 100" to about 300". In a preferred embodiment the frame assembly has a length of about 150". The frame assembly length may be shorter than 100" or longer than 300" to accommodate specific spacecraft lengths.

Each post element 22 includes a plurality of separation fittings 44 for releasable attachment of a spacecraft. In the embodiment shown, four separation fittings 44 securely attach each spacecraft 14; however, the number of fittings 44 used should be in accordance with the specific spacecraft requirements.

Figure 7:
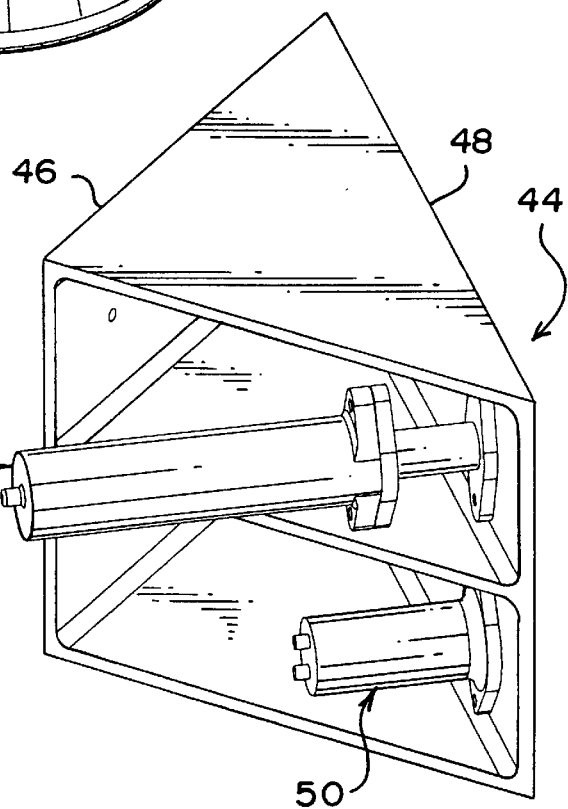
FIG. 7 is a perspective view of a separation fitting utilized in accordance with the principles of the present invention.

Referring now to FIG. 7, a representative separation fitting 44 is illustrated. Separation fitting 44 is a machined metallic design with pockets designed to accommodate the hold down, release and electrical interfaces. There are two interface surfaces, a post element interface surface 46 and a spacecraft interface surface 48. The separation fitting 44 is connected to the post element by mechanical fasteners and/or adhesive bonding. The separation fitting 44 is designed to react loads from the spacecraft into the post element. The hold down on mechanism is a separation nut 50 which releases a bolt (not shown) when signaled to do so. A spring actuator assembly 52 pushes the spacecraft away when released by the separation nut 50. The separation fitting 44 typically has one separation nut 50, one spring actuator 52, and one electrical interface (not shown).

Figure 6:
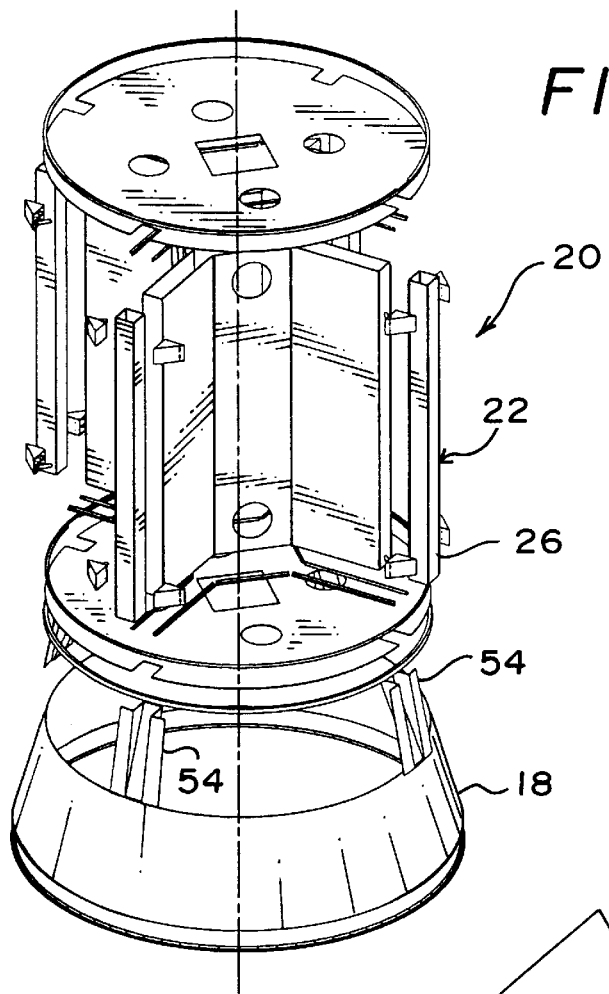
FIG. 6 is an exploded perspective view of a frame assembly attached to a base support structure in accordance with the principles of the present invention.

During assembly of the dispensing system 10, as many frame assemblies 20, as are required to meet the mission parameters are joined together with splices (not shown) attaching the ends of each post elements 22. Such splices may, for example, be a shelf structure with load carrying capabilities. Referring now to FIG. 6, the base support structure 18 is joined to a first frame assembly 20 by means of coupling elements 54 which attach each first end portion 26 of the post element 22 to the base support structure 18. The base support structure 18 may be attached to the launch vehicle upper stage 12 by a series of mechanical fasteners.

During operation, the spacecraft is carried into orbit by the launch vehicle and at the appropriate time a signal is given to the separation fittings to release the spacecraft. The operation is completed when the spacecraft is pushed away from the dispensing system. FIG. 3 illustrates how the spacecraft 14, 14', 14", 14'" are nested between the post elements 22. They are released in a radially outward direction, as indicated by arrow 56.

Variations of the dispensing system include use of the base support structure and one, two, or more stacked frame assemblies. The ability to have varying numbers of frame assemblies offers greater flexibility for mission and planning purposes.

The present dispensing system provides a high inertia by locating the main structural elements, i.e., the post elements, at the maximum dimension allowed by the fairing envelope. That is, the post elements are positioned close to the fairing. This configuration gives the structure maximum stability with minimum weight.

Although the spacecraft illustrated in this detailed description have been satellites, the term "spacecraft" as defined herein encompasses any dispensable payload, including, for example, munitions, canisters, etc.

Obviously, many modifications and variations of the present invention are possible in light of the above teachings. It is, therefore, to be understood that, within the scope of the appended claims, the invention may be practiced otherwise than as specifically described.

What is claimed and desired to be secured by Letters Patent of the United States is:

1. A frame assembly for supporting a plurality of spacecraft relative to a base support structure of a launch vehicle or to another frame assembly for ultimate connection to the base support structure, said frame assembly, comprising:
   i) a plurality of substantially parallel load bearing elongated post elements, said post elements defining a geometry having a center line, each post element having a first end portion and a second end portion, each first end portion being connectable to either another frame assembly, or a base support structure of the launch vehicle, said post elements for supporting a plurality of spacecraft, the spacecraft being supported between adjacent post elements; and
   ii) shear load transferring means connected to said post elements for transferring shear loads between said plurality of post elements wherein said shear load transferring means, comprises:
      a) an elongated hollow central body, said central body having a longitudinal central axis, said central axis and said center line being parallel, said central body being sufficiently sized to accommodate launch vehicle components, said central body comprising a plurality of openings for providing access for said launch vehicle components; and
      b) a plurality of radially extending arms, said arms being attached to said post elements, wherein the volume formed in said hollow central body contains launch vehicle components.

2. The frame assembly of claim 1, wherein said plurality of elongated post elements comprises four equally spaced post elements.

3. The frame assembly of claim 1, wherein said plurality of elongated post elements comprises three equally spaced post elements.

4. The frame assembly of claim 1, wherein each post element comprises a plurality of separation fittings for releasable attachment of a spacecraft.

5. A dispensing system for releasing a plurality of spacecraft from a launch vehicle, comprising:
   a) a base support structure securely fastened to a launch vehicle;
   b) a plurality of stacked frame assemblies, each frame assembly comprising:
      i) a plurality of substantially parallel load bearing elongated post elements, said post elements defining a geometry having a center line, each post element having a first end portion and a second end portion, each first end portion being connectable to either another frame assembly, or said base support structure of the launch vehicle, said post elements for supporting a plurality of spacecraft, the spacecraft being supported between adjacent post elements; and
      ii) shear load transferring means connected to said post elements for transferring shear loads between said plurality of post elements wherein said shear load transferring means, comprises;
         an elongated hollow central body, said central body having a longitudinal central axis, said central axis and said center line being parallel said central body being sufficiently sized to accommodate various launch vehicle components; and
         a plurality of radially extending arms, said arms being attached to said post elements, wherein the volume formed in said hollow central body may be used to contain various launch vehicle components; and
   c) a plurality of longitudinally spaced stabilizers connected to desired locations on said post elements to increase the buckling capability of the dispensing system,
   wherein the provision of a plurality of stacked frame assemblies provides a modular structure with sufficient structural integrity to obviate the need for attachment to the fairing or shroud of the launch vehicle.

6. The dispensing system of claim 5, wherein said plurality of stacked frame assemblies, comprises two stacked frame assemblies.

7. The dispensing system of claim 5, wherein said plurality of stacked frame assemblies comprises three stacked frame assemblies.

8. The dispensing system of claim 5, wherein said plurality of stacked frame assemblies comprises four stacked frame assemblies.

9. The dispensing system of claim 5, wherein each frame assembly has a length on the order of from about 100 inches to about 300 inches.

10. The dispensing system of claim 5, wherein each frame assembly has a length of about 150 inches.

11. The dispensing system of claim 7, wherein each frame assembly includes pairs of post elements which are diametrically opposed relative to said center line, the distance between said pairs being on the order of from about 100 inches to about 200 inches.

12. The dispensing system of claim 5, wherein said plurality of elongated post elements comprises four equally spaced post elements.

13. The dispensing system of claim 5, wherein said plurality of elongated post elements comprises three equally spaced post elements.

14. The dispensing system of claim 5, wherein each post element comprises a plurality of separation fittings for releasable attachment of a spacecraft.

15. The dispensing system of claim 7, wherein said shear load transferring means, comprises:

a) an elongated hollow central body, said central body having a longitudinal central axis, said central axis and said center line being parallel; and
b) a plurality of radially extending arms, extending from said central body, said arms being attached to said post elements, wherein the volume formed in said hollow central body may be used to contain various launch vehicle components.

16. The dispensing system of claim 15, wherein said central body comprises a plurality of openings for providing access for launch vehicle components.

17. The dispensing system of claim 5, wherein the launch vehicle includes a fairing, said plurality of post elements being located proximate said fairing.

* * * * *